United States Patent [19]

Fischer et al.

[11] Patent Number: 4,998,465

[45] Date of Patent: Mar. 12, 1991

[54] APPARATUS FOR PEELING GARLIC

[75] Inventors: Rich Fischer, Aromas; Richard Silva, Gonzales; Henry P. Welton, Gilroy, all of Calif.

[73] Assignee: Dalgety Produce, Inc., Salinas, Calif.

[21] Appl. No.: 571,931

[22] Filed: Aug. 23, 1990

Related U.S. Application Data

[63] Continuation of Ser. No. 363,530, Jun. 8, 1989, abandoned.

[51] Int. Cl.$^5$ .................. A23N 7/00; A23N 15/08
[52] U.S. Cl. ........................ 99/584; 99/516; 99/546; 99/636
[58] Field of Search .............. 99/516, 534, 536, 546, 99/584, 589, 635, 636, 642, 643, 472, 474; 426/482, 483

[56] References Cited

U.S. PATENT DOCUMENTS

| | | |
|---|---|---|
| 2,445,881 | 7/1948 | Hemmeter . |
| 2,766,794 | 10/1956 | Odale . |
| 3,485,279 | 12/1969 | Parsons . |
| 3,543,824 | 12/1970 | Parsons . |
| 3,566,941 | 3/1971 | Morikawa ............... 99/516 |
| 3,602,279 | 8/1971 | Van Raaij . |
| 3,696,848 | 10/1972 | Mellon et al. . |
| 4,361,084 | 11/1982 | Raatz . |
| 4,470,345 | 9/1984 | Miyata . |
| 4,506,600 | 3/1985 | Hersom et al. ............ 99/483 |
| 4,530,278 | 7/1985 | Sarig et al. ............... 99/547 |
| 4,562,772 | 1/1986 | Battistini ............... 99/472 |
| 4,602,559 | 7/1986 | Suzuki et al. . |

FOREIGN PATENT DOCUMENTS

| | | |
|---|---|---|
| 7901641 | 3/1979 | Netherlands . |
| 7906250 | 8/1979 | Netherlands . |
| 283945 | 11/1965 | U.S.S.R. . |
| 0713559 | 2/1980 | U.S.S.R. ............... 99/516 |
| 1096377 | 12/1967 | United Kingdom . |
| 1292058 | 3/1970 | United Kingdom . |
| 1239562 | 7/1971 | United Kingdom . |

Primary Examiner—Timothy F. Simone
Attorney, Agent, or Firm—George J. Netter

[57] ABSTRACT

Garlic cloves to have their outer inedible skins removed are placed on a shake table which spreads them generally into a one-clove layer and moves them toward an exit edge. The cloves drop from shake table onto a sloped feed tray having a number of downwardly extending parallel troughs. Underneath each trough is a tube having a flexible cylinder secured to its lower end which receives cloves from its associated trough. A continuous belt driven along a path to present an upper surface has a number of openings within each of which an open-topped product cup is secured. The flexible cylinder contacts the belt surface and is closed off between product cups and released to feed cloves into the cups upon alignment therewith. A plate is spaced just above the belt and has openings through which nozzles extend to provide a timed blast of pressurized air into the cups for peeling the cloves. The outer skins are removed from the space above the belt by a suction fan.

9 Claims, 3 Drawing Sheets

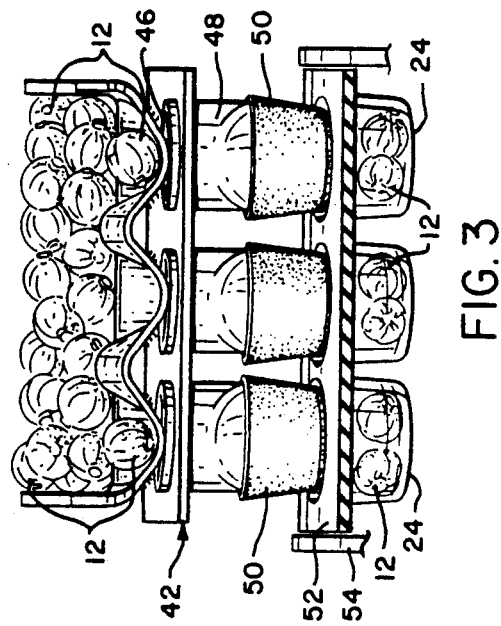
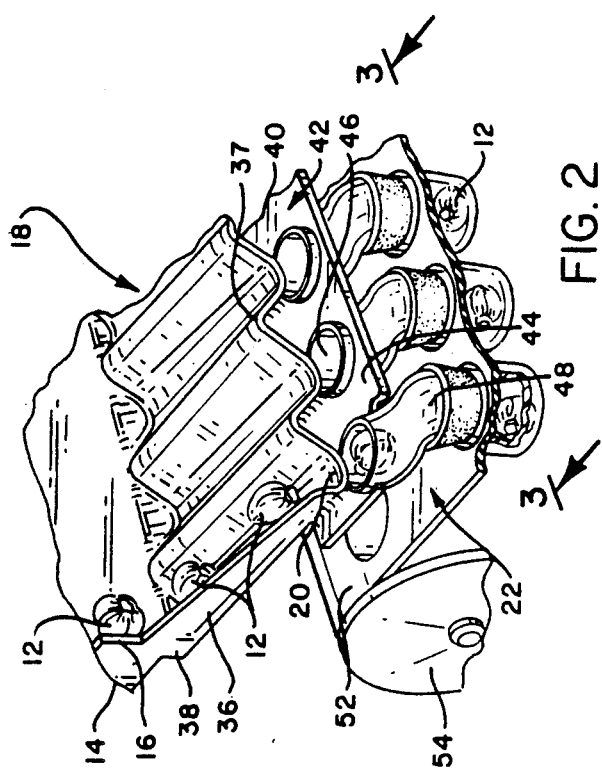
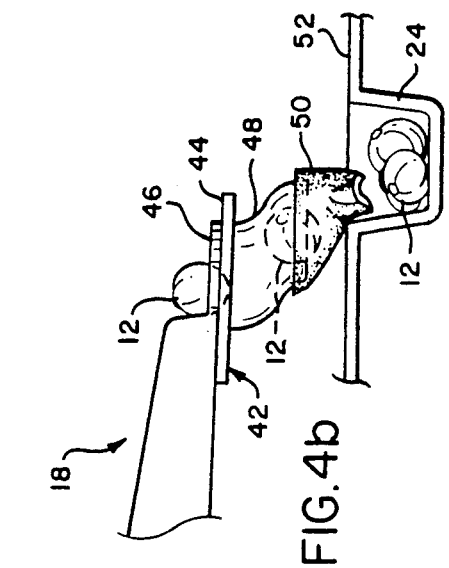
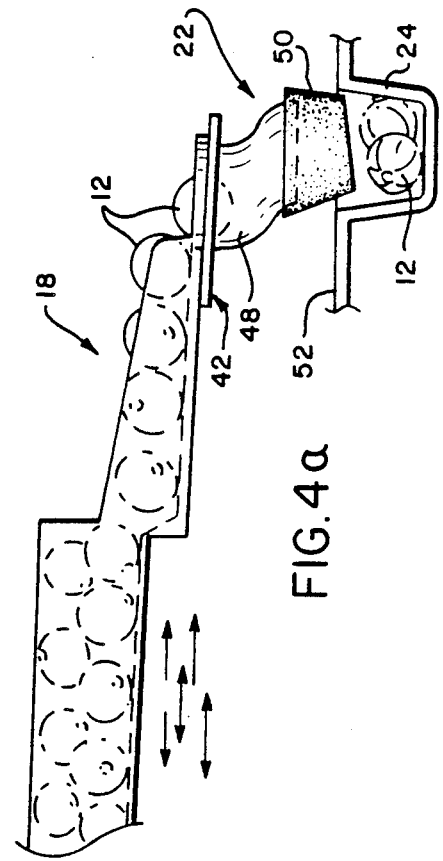
FIG. 2
FIG. 3
FIG. 4a
FIG. 4b

APPARATUS FOR PEELING GARLIC

This is a continuation of application Ser. No. 363,530 filed Jun. 8, 1989, now abandoned.

BACKGROUND OF THE INVENTION

1. Field of the Invention

The present invention relates generally to apparatus for removing the outer skin from garlic cloves.

2. Description of Related Art

Apparatus is available for treating onions, for example, to remove the outer skins or inedible outer layers making them available for immediate use. In the known apparatus, the individual onion bulbs are held by a cup-shaped holder, for example, and are subjected to a blast of pressurized air to remove the outer skin. Also, in certain of these apparatus there is a preliminary step in which the bulb ends are cut off prior to outer skin removal. Exemplary of the known onion peeling techniques are U.S. Pat. Nos. 3,602,279 and 3,485,279.

On the other hand, equipment for removing the inedible outer layers of garlic cloves on a quantity basis has not been found to be commercially available or in the published literature. Peeling garlic poses a more complicated problem than peeling onions, in that, when originally picked, garlic is in the form of a bulb which has an outer inedible skin over it that must first be removed before you can break the bulb down to its component cloves, after which the individual clove skins must be peeled off. Equipment is available for taking garlic bulbs and removing the outer skins to release the cloves, which equipment is sometimes referred to as a "cracker". However, these crackers do not remove the skin from the individual cloves, but merely the bulb skin.

SUMMARY OF THE INVENTION

After a quantity of garlic bulbs have had the bulb skins removed by passing through a cracker, for example, the individual cloves with their respective outer skins still intact are moved along a shaker conveyor which locates the cloves in a generally planar arrangement of approximately one clove thickness. The cloves are then emptied from the shaker conveyor into a special feed tray having a plurality of elongated generally V-shaped troughs extending side-by-side and parallel to one another, and within which troughs individual moving lines of garlic cloves are formed. The tray is tilted downwardly somewhat and optionally shaken during use so that the cloves move along the troughs or channels in a generally single file manner.

Immediately under an end edge of the feeder tray is a feeding mechanism consisting of a plurality of separate tubular conduits, one for each tray trough, for receiving cloves that move off the feeder tray along a gravity path. The opposite end of each tubular conduit has a separate flexible sleeve affixed thereto, the lower end of which contacts the upper surface of a continuous belt conveyor having a plurality of product cups, the open tops of which are coextensive with the upper surface of the conveyor belt As the conveyor belt moves past the feeder mechanism, the flexible sleeve upon encountering the upwardly directed product cup opening relaxes to allow at least one garlic clove to enter into a given cup. As the cup moves away from contact with the flexible sleeve, the flexible sleeve is then closed as a result of contact with the conveyor belt imperforate surface between product cups.

A flat preferably transparent plate substantially the width of the conveyor belt is located above and spaced slightly from the belt. The plate includes a set of spaced apart openings extending transversely across the plate, each of which can be brought into alignment with an underlying product cup as the conveyor belt moves along its path. In each of the plate openings there is located a separate air nozzle extending through the plate opening and positioned just slightly above the continuous belt. Timing apparatus actuates the nozzles to emit a blast of air each time an underlying product cup aligns with the plate opening. Adjacent each end of the plate there is a suction conduit which produces an air flow from the space between the plate and the upper surface of the continuous belt outwardly and through the conduits.

In operation, the cloves with outer skins on are fed along the shake table and the feeder tray troughs to drop into the feeder mechanism which, in turn, deposits at least one, and preferably several cloves, with skins on within each product cup. When a product cup moves into alignment with an air nozzle, a blast of air is emitted from a nozzle of predetermined orifice and directed into the cup causing the garlic cloves to interact with each other, the cup walls, and the covering plate to effect removal of the outer skins. The covering plate is relatively flexible so as to reduce clove bruising during deskinning.

Since the skins are less dense than the clove meat, the skins move into the space between the plate and the upper surface of the continuous belt where they are removed via the vacuum conduits. The deskinned cloves are then dumped onto a further conveyor belt where they are removed for packaging.

DESCRIPTION OF THE DRAWINGS

In the accompanying drawings:

FIG. 2 is an enlarged, partially fragmentary view of the feeder mechanism and feeder tray;

FIG. 3 is an end elevational sectional view taken along the lines 3—3 of FIG. 2;

FIG. 4A is a side elevational, partially schematic view showing operation of the feeder mechanism to deposit cloves into a product cup;

FIG. 4B shows the same feeder mechanism closing off clove feeding;

DESCRIPTION OF A PREFERRED EMBODIMENT

Figure 1:
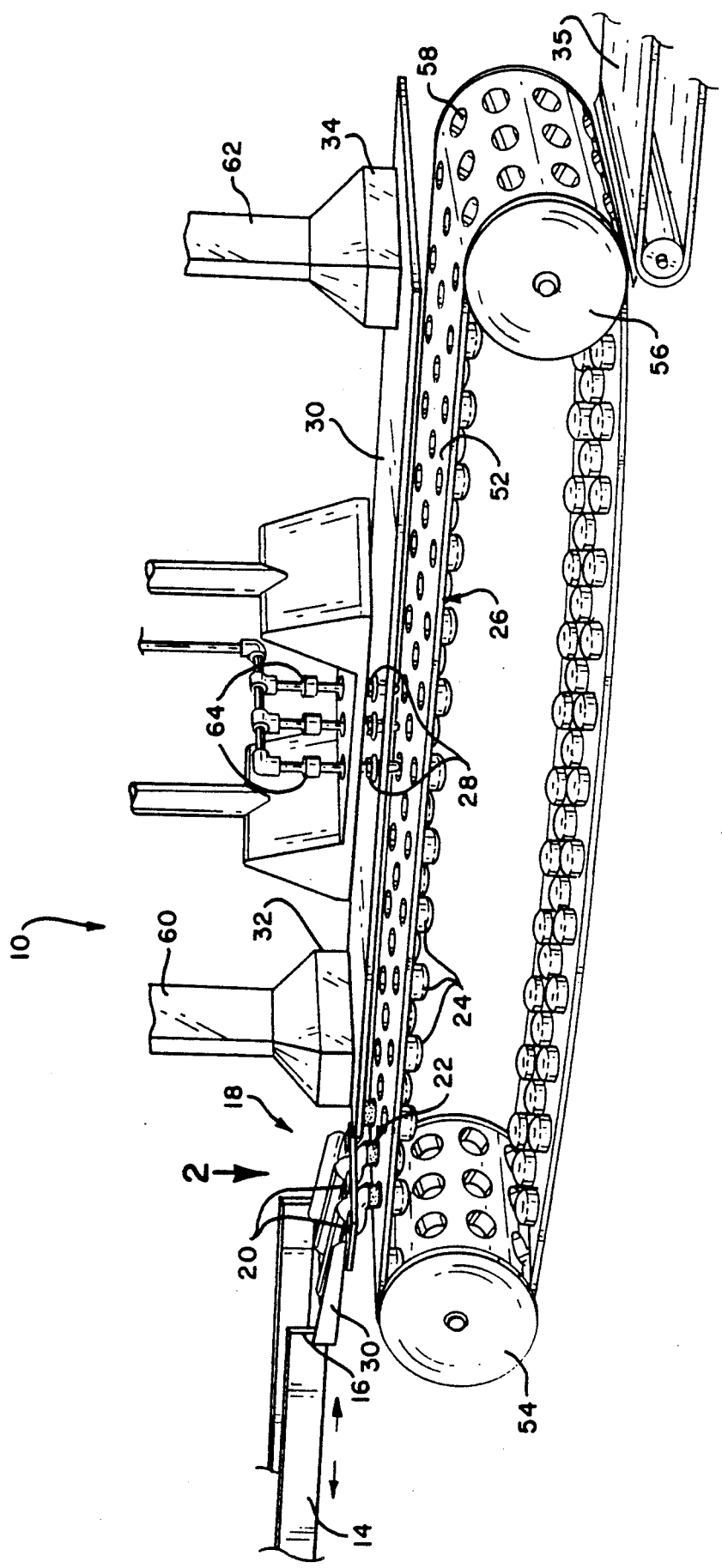
FIG. 1 is a perspective view of the apparatus of the present invention.

Turning now to the drawings and particularly FIG. 1, the apparatus for removing the inedible outer skins of garlic cloves on a quantity production basis is identified generally as 10. As to general operation of the invention, and without regard for detailed constructional aspects, garlic cloves 12 which have been "cracked" from garlic bulbs (not shown) in a conventional way are dumped onto a shake table 14 which essentially consists of an elongated flat upwardly facing surface which is shaken or vibrated in its plane such that the garlic cloves will move in a direction toward an exit edge or end 16. A feed tray 18 receives the garlic cloves from the table exit end 16 and arranges them into a plurality of parallel feed troughs 20 in the upper surface thereof.

The feed tray drops the cloves into a feeder mechanism 22 which, in turn, loads product cups 24 carried by a continuous belt conveyor 26 with at least one clove per cup. The so loaded product cups are conveyed to a central point along the conveyor where they are subjected to a sharp blast of pressurized air by one of the nozzles 28 which removes the garlic clove outer inedible skin and blows it, in the greater majority of cases, out of the product cup where it is removed by an air current produced between a cover plate 30 and the continuous belt conveyor. The air currents are fed into suction hoods 32 and 34 located at the two opposite ends of plate 30 which remove the garlic clove skins. The deskinned garlic cloves are then dumped onto a finished product conveyor 35 where they are moved to a packaging or storage site (not shown).

As can be seen best in FIG. 2, the feed tray 18 includes a generally rectangular sheet of metal formed into a plurality of troughs 20 arranged in side-by-side parallel relation with upstanding wall portions 37 separating adjacent troughs. The tray outer sides are formed into retaining edge walls such as the edge wall 36 which serve to enclose the two outermost troughs. The feed tray is mounted so as to have an entrance side 38 of the tray located slightly beyond and below the end 16 of the shake table 14. The tray exit side 40 is lower than the entrance side so that gravity assists movement of garlic cloves along the troughs. The width of each trough is such as to cause the garlic cloves to generally form into single file along the trough resulting in being fed from each tray in a one-by-one manner.

The clove feeder mechanism 22 is secured to the feed tray lower surface closely adjacent the exit side 40. More particularly, the mechanism includes a mounting plate 42 affixed to the tray lower surface and has a portion 44 extending outwardly beyond the tray exit edge. A plurality of openings 46 are formed in the plate portion just beyond the tray exit edge with each opening centered on an exit edge of an individual tray feed trough 20. A plurality of generally S-shaped tubes 48 each have an end received within a separate opening 46 from the plate lower side so as to extend downwardly from the plate 42 and away from the tray 18.

Each lower end of a tube 48 is provided with a flexible, generally rectangular sheet of plastic 50 rolled into a cylinder with slightly overlapping lateral edges. As shown in FIGS. 4A and 4B, the flexible plastic cylinder extends downwardly toward the continuous belt conveyor 26 and is of such a length as to extend into a product cup 24 when directly opposite the cup which allows the cylinder end to be open. When the imperforate portions of the conveyor 26 engage the cylinder lower end portion, it closes the end off by sliding the overlapping edge portions into greater overlapping relation. That is, the flexible plastic cylinders will allow feeding of the cloves when their ends are received within product cups, but are sealed off between cups to prevent clove feeding.

The conveyor 26 includes a continuous belt 52 mounted upon and driven by a pair of spaced apart rollers 54 and 56. Multiple sets of openings 58 are formed in the belt and arranged in transverse lines with each line including the same number of openings as there are tray feed troughs 20, and aligned therewith as the belt moves adjacent the tray and feeder mechanism.

Each opening 58 in the conveyor belt includes an open mouth product cup 24 secured therein with the open mouth directed outwardly of the belt. More particularly, the product cups are constructed of a rigid plastic having smooth inner wall surfaces and radiused junctions between the side walls and cup bottom.

A cover plate 30 preferably constructed of a flexible transparent plastic, is mounted slightly above and parallel to the conveyor 26 upper surface (FIG. 1). The flexibility is desired to reduce garlic clove bruising during deskinning. The plate spacing above the conveyor is sufficient to insure no contact between them, but not so great as to allow a clove to become trapped in the space. At each end of the plate 30 there are located suction fan hoods 32 and 34 interconnected with respective stacks 60 and 62 which serve to move the air from the space between the plate and conveyor surface outwardly through the stacks.

Figure 5A:
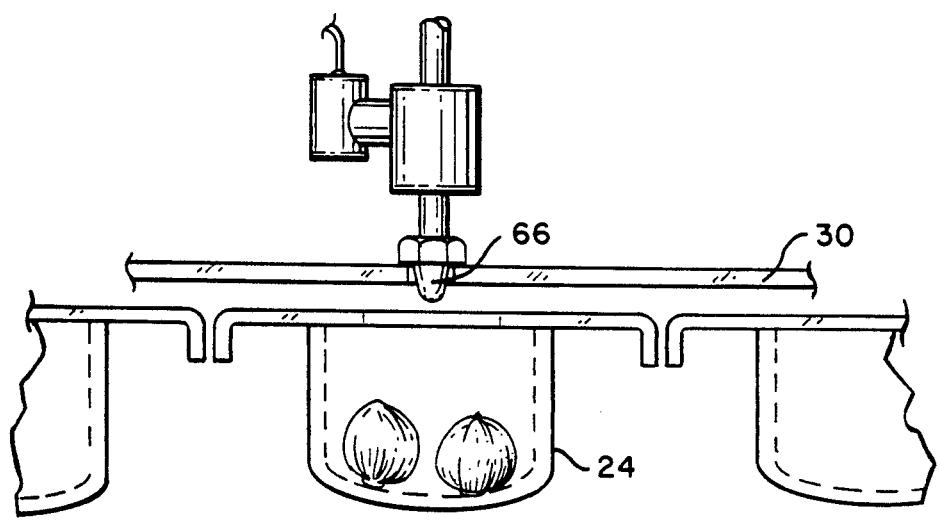
FIG. 5A shows an enlarged, partially fragmentary, side elevational view of a product cup located underneath an air nozzle.
Figure 5B:
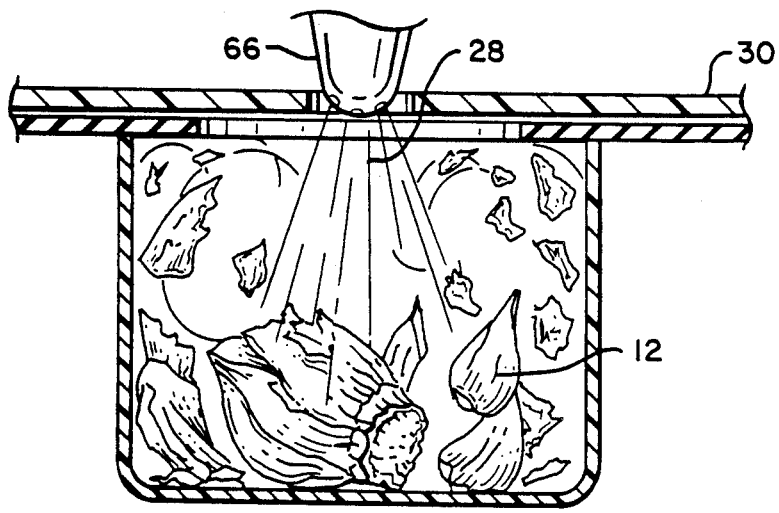
FIG. 5B shows an enlarged view of several garlic cloves in a product cup being deskinned by a blast of air from the described apparatus.

Intermediate the conveyor rollers 54 and 56 and mounted above the plate are a plurality of air pressure dispensing means 64, one for each product cup in a line of cups across the conveyor width. Each dispensing means includes a nozzle 66 which extends through an opening in the plate 30, and, when actuated, directs a high pressure air stream into a product cup (FIG. 5B). In practical construction and use the nozzle orifice size must be controlled, as well as the driving air pressure, and the spacing of the nozzle orifice to the cup bottom In the usual case an orifice size of 11/32 inches is satisfactory, however, a 5/16 inch orifice has been used when the unskinned garlic cloves were relatively moist.

In addition, the pressure of air supplied to the dispensing means lies in the range of 65-80 pounds per square inch. The higher pressure being used for garlic cloves which are relatively firm and the lower pressure for the softer ones. Still further, some adjustment in vertical location of the nozzles may be desired in that when the cloves are relatively large there is improved deskinning with the nozzles positioned at about 4 inches from the cup bottom, while for the smaller cloves a vertical spacing of approximately 2 inches is preferable.

Figure 6:
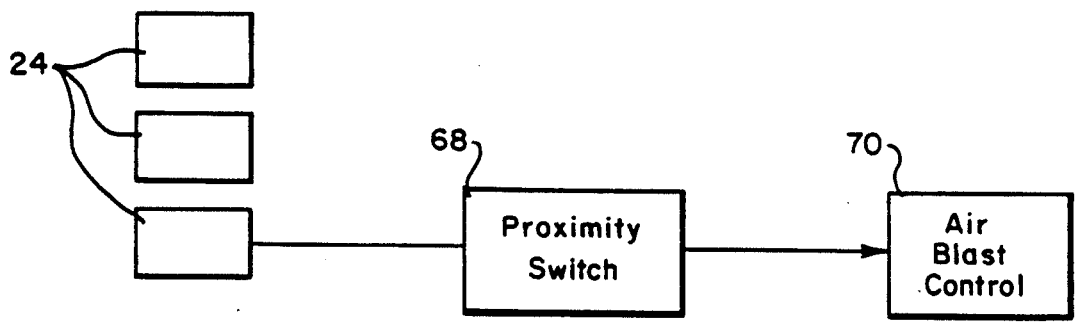
FIG. 6 is a schematic depiction of apparatus for timing the air blasts used in the present invention.

It is necessary that the air pressure dispensing means only be actuated when a cup is located directly opposite a nozzle 66, and otherwise to be inactive. As shown in FIG. 6 this timed actuation of the dispensing means can be effected by use of a magnetic proximity switch 68, which on a product cup moving therepast energizes an air blast control 70. On the cup moving beyond the effective range of the proximity switch, the dispensing means is maintained inactive.

In use of the described garlic peeling apparatus, after cracking of the garlic bulbs the individual cloves with inedible outer skins are loaded onto the shake table 14 where they are spread out into a relatively thin layer (i.e., one clove thick). The shake table dumps the cloves onto the feed tray 18 where they are arranged within the troughs 20 forming a plurality of parallel clove feed lines. The cloves empty from the feed tray troughs individually into feeder mechanism tubes 48 from which they load the flexible cylinders 50. As the continuous belt conveyor 26 moves past the feeder mechanism, the lower end of the cylinders 50 are closed off by contact with the imperforate conveyor surface. When a product cup moves into opposition with a flexible cylinder lower end, the cylinder end is released which allows the garlic cloves contained therein to feed into the cup.

The loaded product cups are conveyed away from the feeder mechanism until they are brought into opposition with a nozzle 28 where an air blast is triggered which removes the outer clove skins. The removed skins are blown into the space between the plate 30 and the conveyor 26 where they are moved by an air stream to the vacuum stacks 60 and 62 for removal. As the conveyor moves about roller 56 the peeled cloves are dumped onto the finished product conveyor 35 for transport to a packaging station.

Although the apparatus and method of the invention have been described in connection with the removal of the outer inedible skins from garlic cloves, it has been found that the invention may also be advantageously employed in removing the outer skins of shallots or pearl onions.

What is claimed is:

1. Apparatus for peeling the outer skin from garlic cloves, comprising:

feeder means for providing a continuous supply of cloves to a plurality of different outlets;

a continuous belt driven along a closed path having an upper surface located immediately adjacent the outlets, said belt including a large number of openings each of which is aligned with a feeder means outlet as the belt moves along the path;

individual cup means positioned within the belt openings, each having an upwardly directed open top when located on the belt upper surface;

a plate located above the belt upper surface and in spaced generally parallel relation thereto, said plate having a plurality of openings each of which is brought into alignment with cup means as the belt moves therepast;

nozzle means inserted into each plate opening and actuatable for directing pressurized air into the cup means and onto cloves contained therein; and means for moving air along and outwardly of the space between the belt upper surface and the facing plate surface to remove peeled clove outer skins.

2. Apparatus as in claim 1, in which the plate is located sufficiently close to the belt upper surface to prevent a clove from moving therebetween.

3. Apparatus as in claim 1, in which the nozzle means are interconnected with a supply of air pressurized to a range of 65-80 pounds per square inch.

4. Apparatus as in claim 3, in which the nozzle means have an orifice of about 11/32 of an inch.

5. Apparatus as in claim 3, in which the nozzle means have an orifice of about 5/16 of an inch.

6. Apparatus as in claim 1, in which the feeder means includes feed tray means for receiving cloves and arranging them into a plurality of lines that are moved off a common edge; and a feeder mechanism including a plurality of flexible open ended cylindrical tubes, the upper end of each being aligned and gravity fed by a feed tray line, and the lower end being compressed by contact with the belt upper surface to contain cloves and released from compression as the lower end moves over a cup means which releases at least one clove into the said cup means.

7. Apparatus as in claim 6, in which each cylindrical tube is constructed of a generally rectangular sheet of flexible material rolled into a cylinder with overlapping lateral edge portions.

8. Apparatus as in claim 7, in which each cylindrical tube is secured onto an end of a rigid hollow tube, said rigid hollow tube being secured within an opening in a mounting plate, said mounting plate being located to receive cloves from the feed tray means.

9. Apparatus as in claim 6, in which the feed tray means includes a sheetlike member formed into a plurality of parallel troughs with upstanding walls between adjacent troughs.

* * * * *